United States Patent [19]
Jutzi

[11] Patent Number: 5,407,470
[45] Date of Patent: Apr. 18, 1995

[54] BIOLOGICAL AIR FILTER
[75] Inventor: Eduard Jutzi, Bern, Switzerland
[73] Assignee: Interhydro AG, Switzerland
[21] Appl. No.: 137,828
[22] Filed: Oct. 15, 1993
[30] Foreign Application Priority Data
Oct. 16, 1992 [CH] Switzerland ............... 03222/92
[51] Int. Cl.$^6$ ............................. B01D 53/04
[52] U.S. Cl. ............................. 96/121; 96/135; 96/142; 47/66; 55/233; 55/250; 55/274; 55/471
[58] Field of Search ............... 47/59, 63–66; 55/233, 234, 248, 250, 259, 274, 279, 356, 360, 467, 471–473; 96/121, 133, 135, 142

[56] References Cited
U.S. PATENT DOCUMENTS

| | | | |
|---|---|---|---|
| 4,415,450 | 11/1983 | Wolverton | 210/602 |
| 4,662,900 | 5/1987 | Ottengraf | 55/233 X |
| 4,732,591 | 3/1988 | Tujisawa et al. | 55/279 |
| 4,959,084 | 9/1990 | Wolverton et al. | 55/68 |
| 5,089,036 | 2/1992 | Hawes | 55/234 X |
| 5,107,621 | 4/1992 | Deutschmann, Sr. | 47/59 X |
| 5,127,187 | 7/1992 | Hattori et al. | 47/59 |
| 5,137,625 | 8/1992 | Wolverton | 210/195.1 |
| 5,190,570 | 3/1993 | He | 55/279 |

FOREIGN PATENT DOCUMENTS
0393408 10/1990 European Pat. Off. .

OTHER PUBLICATIONS
"Interior Landscape Plants for Indoor Air Pollution Abatement", Final Report—Sep. 1989, B. C. Wolverton, Anne Johnson and Keith Bounds, NASA Report MS 39529–6000.

Primary Examiner—Robert Spitzer
Attorney, Agent, or Firm—Speckman, Pauley & Fejer

[57] ABSTRACT

A biological air filter for cleaning, humidifying, and detoxifying air containing harmful substances, having a generally cylindrical filter housing with a sealing cover and a removable filter element. The filter element contains a substrate and plants. Air is circulated through the moist substrate and released into the room. Dust and harmful substances are trapped in the substrate and are at least partially consumed by the plants. The biological air filter can also be connected to an existing ventilating system. It is decorative and suitable for use in offices, apartments, laboratories, doctor offices, and the like.

17 Claims, 1 Drawing Sheet

BIOLOGICAL AIR FILTER

BACKGROUND OF THE INVENTION

1. Field of the Invention

This invention relates to a biological air filter, having a generally cylindrical filter housing capable of receiving water and/or a liquid nutrient, and at least one filter element including a plant pot with a substrate and at least one plant, contained in the housing, wherein air is circulated through the filter element.

2. Description of Prior Art

Many conventional air cleaning and humidifying devices use purely physical or physio-chemical methods which generally require expensive filter elements. These dry or wet filter systems are often an ideally suited nutritive medium for breeding many various types of germs. A somewhat turbulent air flow at the outlet also causes the germs to be carried along and discharged into the room air.

It is known from "Interior Landscape Plants For Indoor Air Pollution Abatement", Final Report—Sept. 1989, B.C. Wolverton, Anne Johnson and Keith Bonds, NASA Report MS 39529-6000, that plants can absorb and metabolize various types of airborne harmful substances. Plants growing in a substrate containing activated charcoal are able to regenerate air containing harmful substances through their roots using a bio-regenerative process and can absorb the harmful substances with the aid of soil bacteria. This bacterial soil life is also capable of destroying pathogenic germs which may be present. The invention can be described as a plant pot in which plants grow on a bed of activated charcoal. The pot is mounted in a container having a blower which blows air upward through the air-permeable but water-nonpermeable bottom of the pot and through the substrate containing activated charcoal. A system which directs excess water from the plant pot into an overflow container is also provided.

SUMMARY OF THE INVENTION

Thus, it is one object of this invention to provide a biological air filter which humidifies room air in buildings, frees it of dust, and removes or reduces harmful substances by bio-regeneration and decomposition.

This object is achieved by a biological air filter according to this invention, wherein air is circulated through at least one filter element having a plant pot with a substrate and at least one plant. The filter is housed in a generally cylindrical filter housing for receiving water and/or a liquid nutrient. A cover with at least one opening to accommodate a filter element seals the housing. The filter element is constructed of a rigid retaining piece with a filter pocket, made of non-corroding material which permits the exchange of air and water and/or liquid nutrient, attached to an opening in the bottom of the filter element.

Drawings illustrating the biological air filter will be described below.

DESCRIPTION OF PREFERRED EMBODIMENTS

Figure 1:
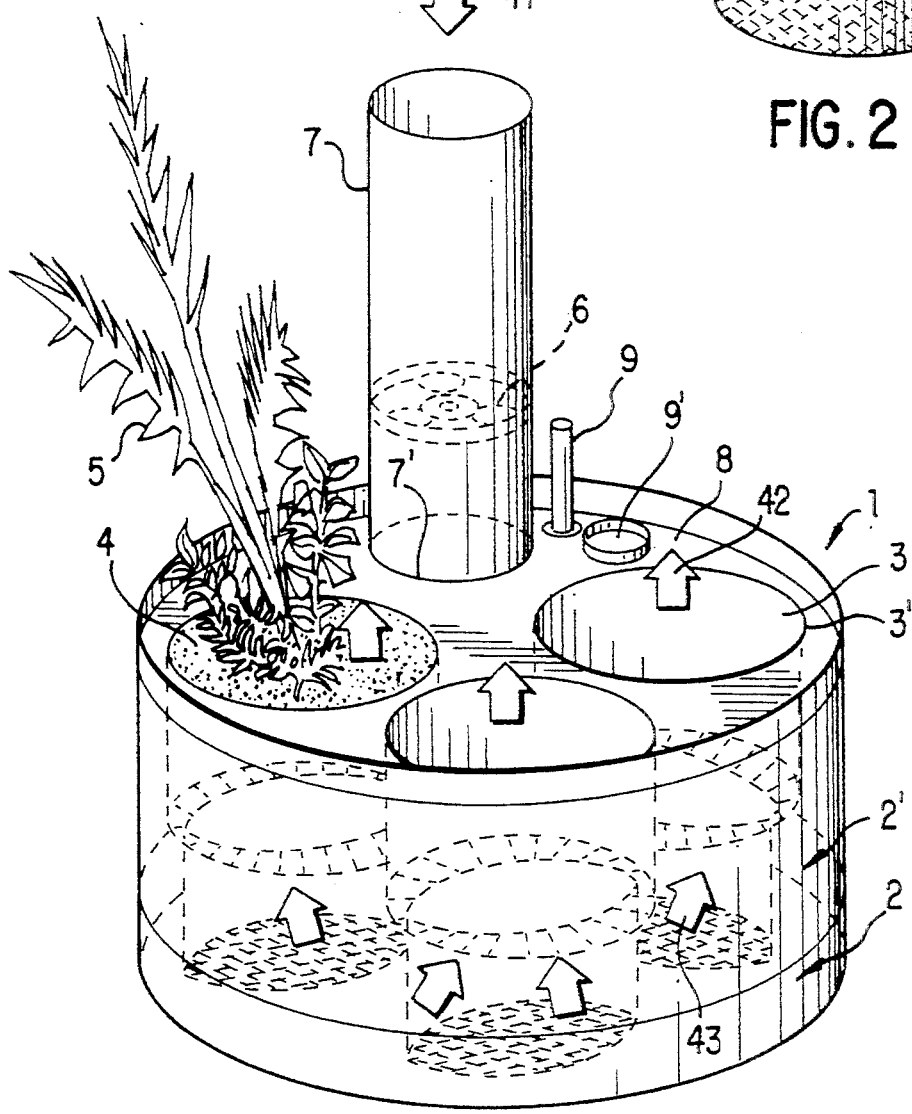
FIG. 1 is a perspective view of the entire air filter assembly.

The biological air filter as shown in FIG. 1 can be modularly constructed. The filters may be designed for use as individual devices, or for installation into already existing house plant arrangements using a hydro-culture system. The filter comprises a large arbitrarily shaped generally cylindrical filter housing 1. The filter housing 1 has a lower area 2, which is filled with water, and an upper area 2' which is a humidifying chamber filled with actively circulating air. The top of the filter housing 1 has a sealing cover 8 with openings 7' to accommodate one or more filter elements 3. In one preferred embodiment with only one filter element 3, the filter element 3 itself can be designed to be the sealing cover 8 of the filter housing 1 with an opening 3'. The filter elements 3 are filled with a suitable substrate 4 and/or with activated charcoal. Selected plants 5 grow in these filter elements 3. Another opening is provided in the cover 8 for allowing ambient room air into the filter housing 1. A blower, for example, can blow air into the upper area 2' of the filter housing 1 between the cover 8 and the lower area 2 filled with water and/or a liquid nutrient. In one preferred embodiment, the blower 6 is located in a suction pipe 7, which penetrates through the cover and can be designed as an acoustical absorbing element. The intake of the suction pipe 7 can be moved to a higher elevation, by extending the length of the suction pipe 7, to better aspirate cigarette smoke and other undesirable substances suspended in the air at higher elevations. The suction pipe 7 can also serve as a climbing aid for the plants growing in the filter elements 3. A water level indicator 9 and a water inlet opening 9' are also installed on the filter housing 1, preferably in the cover 8. It is also possible to dispose the water inlet opening 9' and the water level indicator 9 on the wall of the filter housing 1. To prevent air from escaping through these inlet openings 9' the water level indicator 9 is sealed to the cover 8 of the filter housing 1, and a tube extends from the water inlet opening 9' to below the water level in the filter housing 1, so that no air can escape through the water inlet opening 9'. However, it is also possible to provide the water inlet opening 9' with a check valve, such as a diaphragm, which is kept closed by pressurized air in the filter housing 1. Air is drawn by the blower 6 in a direction 41 leading from the ambient surroundings into an area 2' above the water in the filter housing 1 where it absorbs moisture. The air is then blown in a direction 43 leading from the bottom to the top of the filter housing 1 through the filter elements 3 containing activated charcoal and substrate 4, where the air is cleaned and harmful substances are removed, and is then discharged back into the ambient air in a direction 42 leading away from the filter housing 1.

Figure 2:
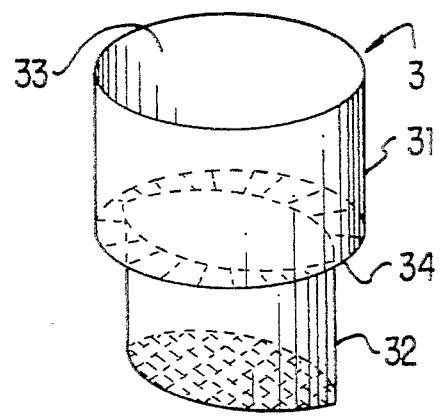
FIG. 2 is a perspective view of a filter element.

A single filter element 3, which is also a plant pot for plants, is shown in FIG. 2. The filter element 3 comprises a closed-form retaining piece 31 which fits into the cover 8, and a filter pocket 32 attached to an opening in the bottom of the retaining piece 31. The retaining piece 31 is preferably embodied as a pipe element 31, the bottom 34 of which is closed off with a fine-meshed grid which transitions into one or more filter pockets 32. The filter pocket 32 and the pipe element 31 form a container with an upper opening 33. Each filter element 3 contains one or more plants 5 in a substrate 4 comprising, for example, activated charcoal and granulated clay. For the purpose of supplying the substrate 4 with water, the filter pockets 32 are partially submerged in water. The compression of the filter pockets 32 can be varied depending on the water requirements of the plants 5. However, it is also possible to construct the filter pockets 32 to have a rigid, arbitrary cross section if control of the amount of water reaching the plants is not desired. The filter elements 3 fit snuggly into the openings in the tightly sealing cover 8 of the filter housing 1. Air flows through the portion of the filter elements 3 not immersed in water via the substrate 4 and the roots or plants growing in the filter. The flow of air at the substrate surface is generally laminar, which prevents germs that might be present from being carried along. As the air flows through the filter, the leaves and roots of plants can absorb and metabolize various harmful substances in the air. Air saturated with harmful substances is quickly absorbed by the activated charcoal and is slowly regenerated by a bio-regeneration process, by the plant roots and bacterial soil life. The bacterial soil life is also capable of destroying pathogenic germs that may be present.

The activated charcoal and/or plants or filters in the biological air filter also remove dust from the air and can biologically decompose a large portion of the harmful substances, germs, and odors in the air. In addition, the actively circulating air absorbs moisture from the water surface while in the container, as well as while flowing through the substrate 4. In this way, the air is humidified as well. Because the filter elements 3 have been partially submerged in the water, water is continuously drawn upwards through the roots and the substrate 4, so that the substrate 4 never dries out, in spite of the air circulation in the filter elements 3.

Conventional house plants, as well as plants particularly suited for the bio-regeneration of certain harmful substances, can be used in the filter. Gerbera jamesonii, for example, is especially suited for cleaning air loaded with benzene or trichloroethylene.

The biological air filter is especially suited for use in the office and the home. However, it may also be used in work places where solvent vapors are released in small amounts, for example labs, doctor offices, graphic arts businesses, and the like.

Other embodiments of this invention have other improvements. A water level switch can be connected to a control device which is connected to the blower 6. In this way, as the water level decreases, the output of the blower 6 is increased until the blower 6 is completely stopped and the device acts as a conventional hydroculture system.

The biological air filter can also be connected to an existing ventilation system. In this manner, the opening for drawing in air can also be attached to the side of the filter housing 1. This arrangement may also be applied to the water inlet opening 9' and the water level indicator 9.

Potting soil, such as light expanded clay aggregate, is suitable as a substrate and can be mixed with activated charcoal, if desired, to increase the effectiveness of the filter. A mixture of ⅔ activated charcoal and ⅓ clay granulate has been shown to be most appropriate for certain types of plants. To increase the surface area for increased air penetration, the sides of the filter pockets 32 can be at least partially corrugated or formed in loops. In larger installations, one or more biological filters can be directly connected to an existing ventilation system. In addition, it is possible to add means for fastening poles for climbing plants and lighting equipment.

What is claimed is:

1. A biological air filter, comprising a generally cylindrical filter housing (1) capable of receiving water or a liquid nutrient, at least one filter element (3) contained in the filter housing, and means for active air circulation through said at least one filter element (3), said at least one filter element (3) having a plant pot with a substrate (4) and at least one plant (5), the filter housing (1) having a sealing cover (8) with at least one opening (3') adapted to accommodate said at least one filter element (3), each said at least one filter element (3) comprising a rigid retaining piece (31) with a porous filter pocket (32) of non-corroding material attached to an opening of a bottom surface of said at least one filter element (3) allowing an exchange of air and said water or liquid nutrient.

2. A biological air filter according to claim 1, wherein said at least one filter element (3) partially extends into a lower area (2) of the filter housing (1) which is filled with said water or liquid nutrient.

3. A biological air filter according to claim 2, wherein the substrate (4) comprises activated charcoal.

4. A biological air filter according to claim 3, wherein the means for active air circulation comprises a blower (6) in communication with an opening (7') in the biological air filter.

5. A biological air filter according to claim 4, wherein the opening (7') is positioned in the sealing cover (8).

6. A biological air filter according to claim 5, wherein the blower (6) is positioned in a suction pipe (7), and the suction pipe (7) projects through the opening (7') in the sealing cover (8).

7. A biological air filter according to claim 6, wherein the rigid retaining piece (31) of said at least one filter element (3) forms a pipe section.

8. A biological air filter according to claim 1, wherein the filter pocket (32) has a corrugated wall.

9. A biological air filter according to claim 8, further comprising at least one of a closeable water inlet opening (9') in the biological air filter and a water level indicator (9) attached to the biological air filter.

10. A biological air filter according to claim 9, wherein the means for active air circulation comprise a blower (6) in communication with an opening (7') in the biological air filter, an output of the blower (6) is controllable by the water level indicator (9) cooperating with a control device.

11. A biological air filter according to claim 1, wherein the substrate (4) comprises activated charcoal.

12. A biological air filter according to claim 1, wherein the means for active air circulation comprise a blower (6) in communication with an opening (7') in the biological air filter.

13. A biological air filter according to claim 1, wherein the means for active air circulation comprise a blower (6) in communication with an opening (7') positioned in the sealing cover (8).

14. A biological air filter according to claim 1, wherein a blower (6) is positioned in a suction pipe (7) and the suction pipe (7) projects through an opening (7') in the sealing cover (8).

15. A biological air filter according to claim 1, wherein the rigid retaining piece (31) of the filter element (3) forms a pipe section.

16. A biological air filter according to claim 1, further comprising at least one of a closeable water inlet opening (9') in this biological air filter and a water level indicator (9) attached to the biological air filter.

17. A biological air filter according to claim 1, wherein the means for active air circulation comprise a blower (6) in communication with an opening (7') in the biological air filter, an output of the blower (6) is controllable by the water level indicator (9) cooperating with a control device.

* * * * *